US007030391B2

(12) United States Patent
Zagrobelny

(10) Patent No.: US 7,030,391 B2
(45) Date of Patent: Apr. 18, 2006

(54) ULTRAVIOLET STERILIZATION DEVICE

(75) Inventor: Richard Zagrobelny, Kitchener (CA)

(73) Assignee: CFM Corporation, Ontario (CA)

( * ) Notice: Subject to any disclaimer, the term of this patent is extended or adjusted under 35 U.S.C. 154(b) by 0 days.

(21) Appl. No.: 10/783,387

(22) Filed: Jun. 4, 2004

(65) Prior Publication Data

US 2005/0269521 A1 Dec. 8, 2005

(51) Int. Cl.
*C02F 9/12* (2006.01)
*C02F 1/32* (2006.01)

(52) U.S. Cl. ...................... 250/435; 250/438; 210/232; 210/238; 210/259; 210/205

(58) Field of Classification Search ............ 250/504 R, 250/435, 438; 210/188, 745, 85; 204/157.3
See application file for complete search history.

(56) References Cited

U.S. PATENT DOCUMENTS

| | | | | |
|---|---|---|---|---|
| 3,894,236 | A * | 7/1975 | Hazelrigg | 250/435 |
| 4,002,918 | A | 1/1977 | Graentzel | 250/431 |
| 5,247,178 | A | 9/1993 | Ury et al. | 250/438 |
| 5,622,622 | A * | 4/1997 | Johnson | 210/192 |
| 5,942,110 | A * | 8/1999 | Norris | 210/198.1 |
| 5,997,812 | A * | 12/1999 | Burnham et al. | 422/24 |
| 6,451,202 | B1 * | 9/2002 | Kuennen et al. | 210/136 |
| 6,511,638 | B1 * | 1/2003 | Matsuzaki | 422/186.18 |
| 6,590,217 | B1 * | 7/2003 | Freeman et al. | 250/435 |

FOREIGN PATENT DOCUMENTS

| | | |
|---|---|---|
| CA | 2030674 | 6/2002 |
| GB | 247231 | 3/1927 |
| JP | 07068163 | 3/1995 |
| JP | 2004066045 | 3/2004 |
| WO | WO 01/73362 A1 | 10/2001 |

OTHER PUBLICATIONS

European Search Report dated Sep. 27, 2005; for EP 05 25 0944; Filing Date Feb. 18, 2005.

* cited by examiner

*Primary Examiner*—Nikita Wells
*Assistant Examiner*—Johnnie L Smith, II
(74) *Attorney, Agent, or Firm*—Baniak Pine & Gannon

(57) ABSTRACT

An apparatus for irradiation of a fluid with UV light includes a tubular body consisting of UV-permeable material. The body includes a fluid chamber and openings for passage of fluid. A UV source is provided to subject the chamber to the UV light. Light baffles define an irradiated section of the chamber to prevent light penetration beyond the irradiated section while permitting the fluid to flow through. The apparatus is provided as a component in a housing having a modular design. The modules include a back cover for surface mounting. The body is mounted to the back cover. An inner cover is attached to the back cover. The inner cover includes the UV source and modular electronics. A front cover is attached to the inner and back cover. Heat sink elements are provided to control the heat produced in the apparatus.

11 Claims, 2 Drawing Sheets

ULTRAVIOLET STERILIZATION DEVICE

FIELD OF THE INVENTION

This invention relates to an apparatus for subjecting fluids to ultraviolet (UV) light. The apparatus may be used for water sterilization and is intended for Point-of-Entry use.

BACKGROUND OF THE INVENTION

Point-of-Entry ultraviolet water sterilization devices typically include a pressure vessel including a stainless steel cylinder enclosing a smaller concentric quartz light transmission tube. Within the quartz tube is a tubular discharge lamp emitting light with wavelengths typically centered around 254 nm, which is referred to as ultraviolet light or ultraviolet radiation. Ultraviolet (UV) light represents a section of the overall electromagnetic spectrum of light, extending from the blue end of the visible at about 400 nm to a region of about 100 nm.

Water to be exposed to the light from the lamp is passed between the interior surface of the steel cylinder and the exterior surface of the light transmission tube. One important limitation to this type of device is that the exterior surface of the quartz tube becomes fouled with inactivated biological contaminants in the water as well as minerals at least in part due to a photochemical reaction upon exposure to the light of the lamp. Due to the arrangement of the discharge lamp contained in a quartz sheath, the foulants collect on the exterior of the quartz tube. The foulants cause a reduced transmission of ultraviolet light through the light transmission tube, which results in a reduced efficacy of the device. This requires that the device be disassembled periodically for cleaning of the quartz tube to maintain its effectiveness.

To reduce maintenance and downtime, automatic wiping mechanisms have been tried on these systems with limited success. U.S. Pat. No. 5,266,280 discloses a system of radially mounted brushes that act to wipe the external surface of the quartz sheath. This costly mechanism is difficult to actuate and to provide adequate sealing for the power transmission shaft connected to the motor outside of the steel cylinder of the pressure vessel. Also described are a number of other similar external wipers, which have varying amounts of effectiveness. Cleaning the tube in this manner is cumbersome and compromises the irradiation dosage of the device because the gap between the outer wall of the quartz sheaf and the inner wall of the pressure vessel must be increased to accommodate the wiper resulting in a larger dosage gradient across the laminar fluid cross section.

Attempts have been made at providing means to conduct fluid through a quartz tube with UV emitting lamps arranged external to the quartz tube and with a wiper mechanism acting to clean the inside walls of the tube. These attempts have failed primarily due to material degradation. The ultraviolet light emitted by germicidal lamps causes degradation of some form in all polymer-based materials. Many components used in the construction of an internal automated wiper system must be polymer-based for friction reduction, manufacturability and sealing-performance reasons. U.S. Pat. No. 5,266,280 describes a number of UV resistant materials such as halogenated polyolefins, urethane, synthetic rubber and high-density polypropylene, all of which are susceptible to being degraded by UV light. Some polymeric materials resist UV degradation. However, when they are exposed to UV radiation centered around 254 nm, and are provided in contact with the fluid being sterilized, will leach small doses of volatile organic compounds. This defeats the purpose of purification. Materials certified by government organizations for use with potable water are tested without irradiation of UV light and many polymers in this category are found to be non-compliant after irradiation. For this reason it is unacceptable to simply claim compliance for potable water of materials used in irradiated locations of UV sterilization devices as is typically done.

U.S. Pat. No. 4,002,918 discloses a device of similar arrangement for the purpose of "the irradiation of fluids to initiate chemical reactions", but describes wiper materials as being plastic, which are unacceptable for ultraviolet water sterilization applications. There is no mention of shielding materials from harmful ultraviolet light to prevent the leaching of volatile organic compounds, which has been observed to be a critical factor in the design of ultraviolet water sterilization devices.

Another area of concern is the tendency for heat to build up in the apparatus, which potentially leads to a reduction of reliability and efficacy of the unit.

There is a demand for a UV water purification device that combines superior performance and low maintenance costs. The present invention satisfies this demand.

SUMMARY OF THE INVENTION

Operation of an U.V. sterilization device which satisfies many of the above-noted requirements is exemplified by U.S. Pat. No. 6,590,217, which is incorporated in its entirety by reference. A preferred embodiment of the invention is described with respect to an ultraviolet water purification device or reactor with a novel arrangement of components and materials that provides superior performance and serviceability and yet still allows manufacturability and maintenance at reasonable cost and by relatively simple means.

The present invention relates to an apparatus for use in water purification having improved effectiveness through the employment of a self-cleaning mechanism to maintain a desired degree of transmittance of ultraviolet radiation through an ultraviolet transparent quartz tube for ultraviolet lamps. The apparatus includes an efficient arrangement of light shielding baffles to protect UV sensitive components from the UV light. The apparatus is provided as a component in a housing having a modular design. Aspects of the present invention function to enhance the efficiency and consistency of the apparatus by controlling heat.

According to an aspect of the invention, an apparatus is provided that employs plates formed of a material impervious to ultraviolet radiation on all wavelengths, which acts to shield other components such as rubber and polymer-based seals and bearings from the harmful effects of direct ultraviolet irradiation. The apparatus includes a tubular body, which may be a quartz tube for conducting fluid therethrough having an internally mounted wiper for the continuous cleaning of an inside surface of the tubular body. Potentially biologically contaminated fluids are irradiated by at least one radiation source including at least one elongated discharge lamp mounted externally with respect to the fluid-conducting tubular body. The wiper is formed of stainless steel or other UV-impervious materials. The wiper may include a rectangular elongate blade mounted to a shaft extending along the long axis of the apparatus. The blade may be provided with one or more holes for increased light penetration and for the production of turbulence. The blade may include slits formed therein, for stress relief of the blade, which extend perpendicular to the axis of the shaft.

The radiation source may be surrounded with high-efficiency reflectors designed to concentrate light on the central axis of the fluid being conducted through the tubular body. The reflectors are provided with exterior cooling fins so as to operate as a heat radiating surface and thus, to reduce the heat build up inherently generated by the radiation source. The radiation source is held by a heat sink at a point distant from the filament end of the source. The heat sink is cooled by a cooling fan. In one embodiment, the cooling fan is activated by a temperature sensor.

One embodiment of the apparatus of the present invention provides irradiation of a fluid with UV light and includes a tubular body consisting of a UV-permeable material. The tubular body includes an inner surface defining a fluid chamber and open first and second ends for ingress and egress of the fluid through the fluid chamber. At least one UV radiation source is provided and is so arranged relative to the tubular body as to subject the chamber to the UV light. A wiper is centrally supported in the body for rotation therein, sized and shaped to contact the inner surface. First and second light baffles are positioned inside the tubular body adjacent respective first and second ends and define an irradiated section of the fluid chamber therebetween to prevent UV light penetration beyond the irradiated section of the fluid chamber while permitting the fluid to flow through the apparatus.

The apparatus may be provided as a subassembly in a housing having a modular design. One aspect of the invention provides an apparatus for irradiation of a fluid with UV light including a back cover for mounting on a surface. A UV chamber subassembly is mounted to the back cover. The UV chamber subassembly includes a tubular body with an inlet and an outlet for ingress and egress of the fluid therethrough. A front cover is attached to the back cover. One or more radiation source is provided to the UV chamber subassembly. The one or more radiation source produces UV light so arranged relative to the tubular body as to subject the fluid to the UV light. An electronics module is attached to the inner cover and is electrically connected to the one or more radiation source for controlling operation thereof.

Another aspect of the present invention provides an apparatus for irradiation of a fluid with UV light including a tubular body consisting of a material which is UV-permeable. The tubular body includes an inner surface defining a fluid chamber with an open first end and an open second end for ingress and egress of the fluid through the fluid chamber. A radiation source is provided for producing UV light arranged relative to the tubular body to subject the fluid chamber to the UV light and a reflector arranged relative to the radiation source to direct light emitted from the radiation source toward the fluid chamber.

Further aspects of the present invention specify that the tubular body may be preferably oriented vertically. The radiation source may be a pair of parallel UV lamps. The pair of parallel UV lamps may be positioned on opposite sides of the tubular body. A heat sink may be positioned in operative contact with the radiation source. The apparatus may further include a fan with the fan being positioned to direct air onto the heat sink. The outside surface of the reflector may include heat dissipating elements, e.g., cooling fins. The heat dissipating elements may be oriented vertically.

Yet another aspect of the present invention provides an apparatus for irradiation of a fluid with UV light including a tubular body consisting of a material which is UV-permeable. The tubular body includes an inner surface defining a fluid chamber with an open first end and an open second end for ingress and egress of the fluid through the fluid chamber. A radiation source is provided having a first end and a second end opposite the first end, for producing UV light arranged relative to the tubular body so as to subject the fluid chamber to the UV light. The first end includes a filament and the second end is actively cooled.

Yet another aspect of the present invention provides an apparatus wherein the first end may be oriented adjacent an upper end of the tubular body and the second end is oriented a lower end of the tubular body. The radiation source may be a pair of UV lamps. Each of the pair of UV lamps may include a respective heat sink positioned in contact with the second end. The apparatus may further include a fan positioned so as to direct airflow onto a respective heat sink. The apparatus may include a heat conductive material provided between each the heat sink and the UV lamp. The apparatus may further include a flow sensor placed in operative communication with the filament so as to dim the radiation source during a period of low fluid flow through the apparatus.

It will be understood that any one or more of the cooling fins of the reflector, the heat sink and the cooling fans may be considered all or part of an active cooling feature of the present invention. Accordingly, the present invention will contemplate any arrangement of elements so as to provide a cooling of the UV subassembly, especially the interior chamber thereof, as compared to ordinary convection of the lamps in prior art arrangements.

These and other advantages, as well as the invention itself, will become apparent in the details of construction and operation as more fully described and claimed below. Moreover, it should be appreciated that several aspects of the invention can be used in other applications where irradiation of fluids would be desirable.

DETAILED DESCRIPTION OF A PRESENTLY PREFERRED EMBODIMENT

Figure 1:
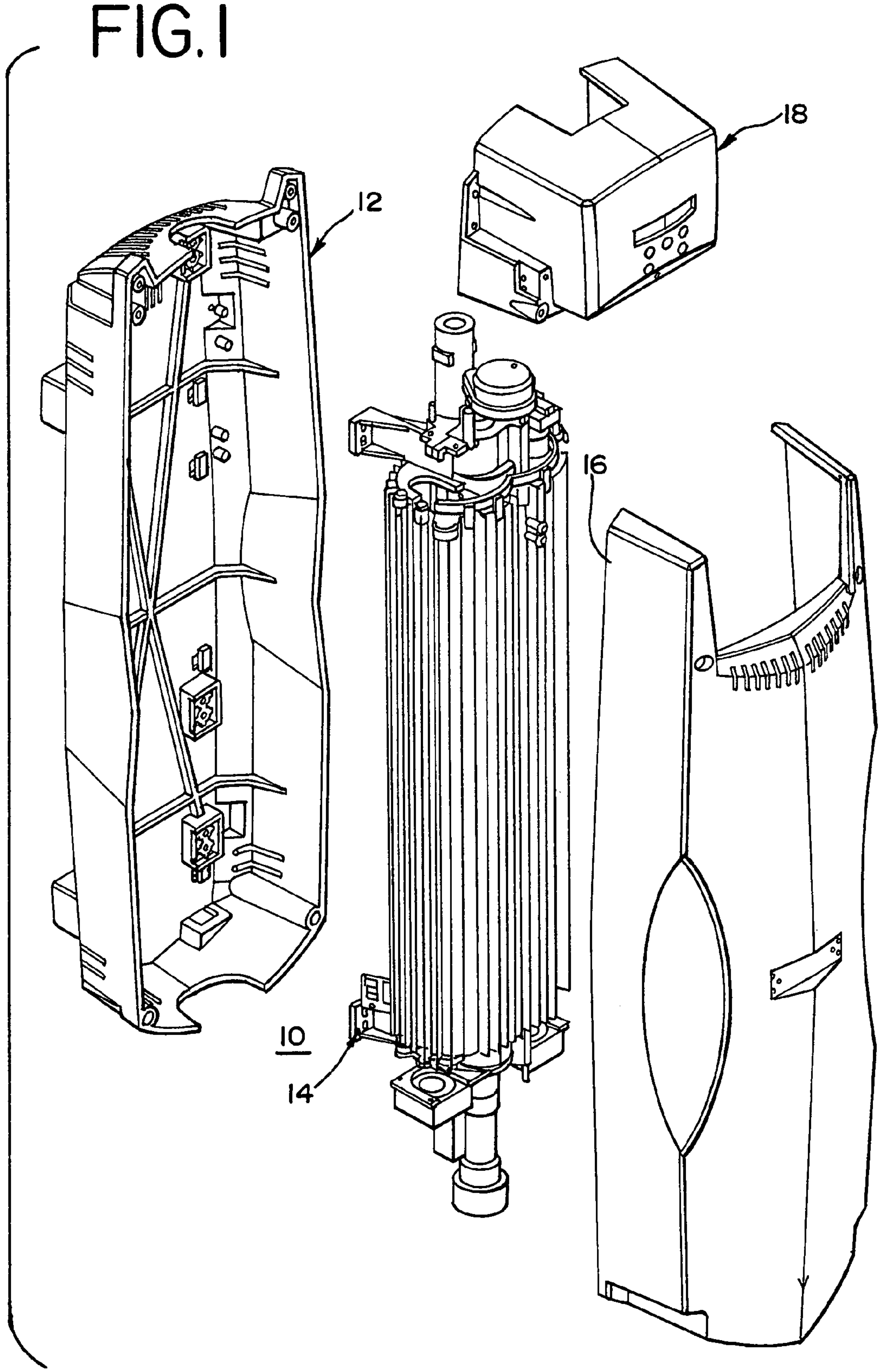
FIG. 1 is a perspective view of subassemblies of one embodiment of the apparatus of the present invention.

FIG. 1 illustrates one embodiment of subassemblies of an apparatus 10 according to the present invention. A back body housing 12 defines a chamber in which a UV chamber subassembly 14 is positioned. A front body cover 16, when fastened to the back body housing 12 effectively encloses the UV chamber subassembly 14. An electronic subassembly 18 fastens to an upper end of the back and front body covers 12, 16. It will be understood that reasonably different arrangements which function in an equivalent fashion and different appearances of the subassemblies are contemplated by the present invention. Furthermore, it will be understood that it is considered within the current state of the art for one to design appropriate circuitry to provide the functionality of the apparatus of the present invention.

Figure 2:
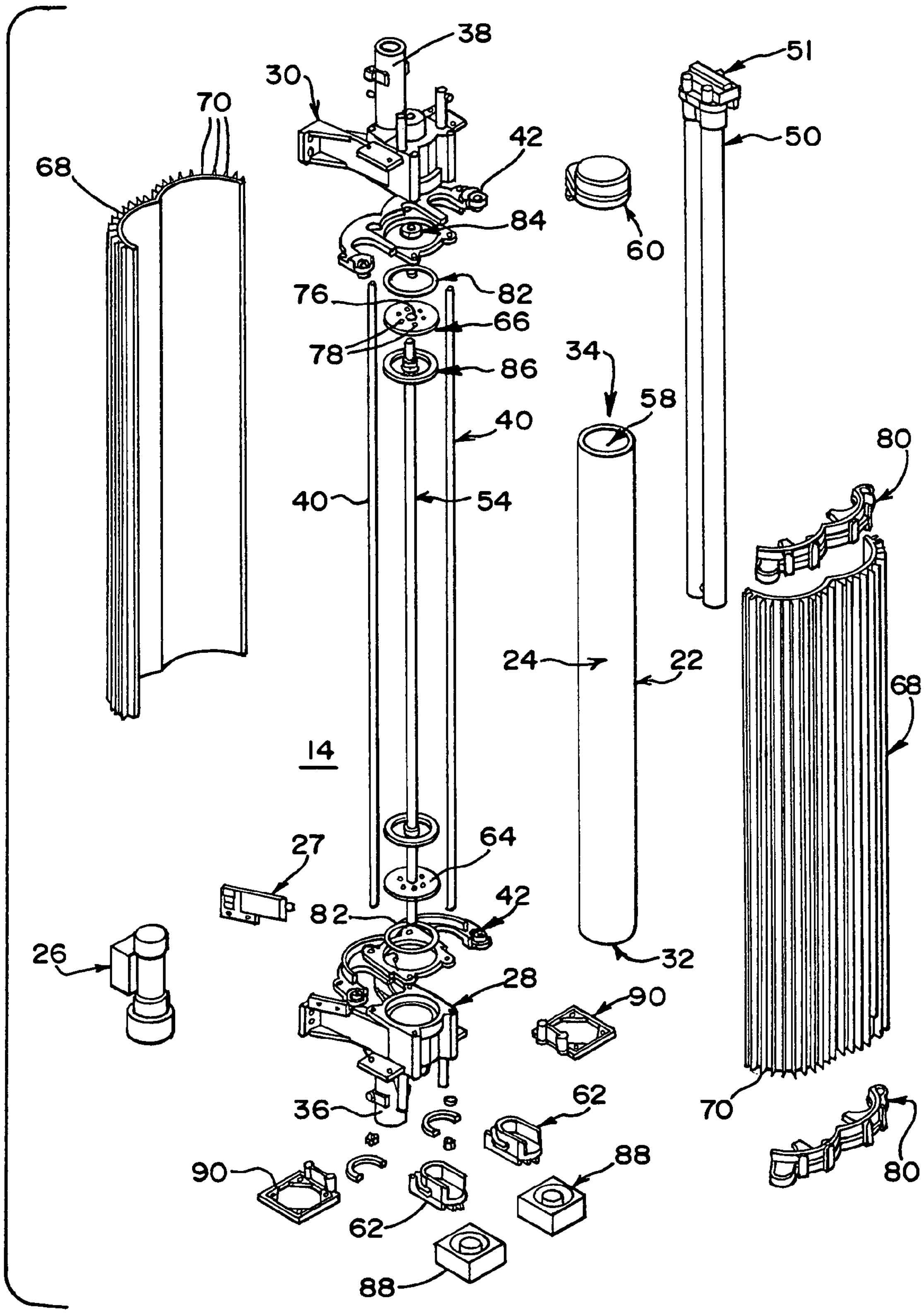
FIG. 2 is an exploded perspective view of a UV chamber subassembly of the embodiment of FIG. 1

An embodiment of the UV chamber subassembly 14 according to the present invention is illustrated in FIG. 2. It will be understood that the elements of the subassembly 14, described hereinafter, will preferably be contained within a housing 12, 16 (see FIG. 1) made of, for example, plastic or metal, or any suitable material.

The subassembly 14 includes a tubular body 22, an inside 58 of which defines a fluid chamber 24, through which a fluid is passed, e.g., water. The tubular body 22 is made of a material that does not significantly reduce transmission of UV light therethrough and is not degraded by UV light. For example, the tubular body 22 is preferably made of quartz in a hollow tube or cylindrical shape.

First and second end caps 28, 30 are positioned to seal against tubular body 22 at first and second open ends 32, 34 of the body. The first and second end caps 28, 30 may be formed of a polymeric material, by injecting molding, for example, a metallic material or any suitable material. The first and second end caps 28, 30 may be drawn together by tie rods 40, which may be inserted into threaded openings 42 of the end caps. A variety of seals may be used between the first and second end caps 28, 30 and respective first and second open ends 32, 34, as will be explained below, to prevent fluid loss from fluid chamber 24.

The first cap 28 may include an inlet 36 for receiving fluid, which channels the fluid into the fluid chamber 24. The second end cap 30 may include an outlet 38 for permitting fluid to exit the fluid chamber 24 after being irradiated. The second end cap 30 may include a valve and a solenoid assembly (not shown) for controlling the flow of fluid through outlet 38 and thus, through chamber 24. The first cap 28 may include a flow sensor 26 and associated electronics 27 to sense the flow of fluid through the inlet 36. In one embodiment, when fluid flow falls to a predetermined level, e.g., to zero flow, the unit may be powered down to save energy and reduce heat production.

A UV radiation source 50, for example one or more Phillips 55W or 36W TUV PLL, is arranged about the tubular body 22. The radiation source 50 is preferably designed to emit a high concentration or percentage of ultraviolet light. The UV radiation source 50 is arranged to provide a maximum penetration of UV light through the tubular body 22 and ensure a maximum exposure of the fluid to the emitted UV radiation. The present invention contemplates providing any effective arrangement of UV light sources, which can be a single lamp or a plurality of lamps arranged about the tubular body 22. Also, the source 50 is held by a lamp holder 51, e.g., made by Etin-Daniels FL 446.

The tubular body 22 is provided a first light baffle 64 and a second light baffle 66 each adjacent a respective end thereof 30, 32 to define an irradiated section therebetween of the fluid chamber 24. It can therefore be seen that components of the subassembly 14, positioned outside of the irradiated section of the chamber 24 are shielded from exposure to UV light by baffles 64, 66. First and second light baffles 64, 66 are preferably made of a material impervious to UV light degradation, such as stainless steel. The light baffles 64, 66 each include a central axial bore 76 for receiving and supporting a central shaft 54 and at least one passageway 78 formed therethrough for permitting fluid to pass through each baffle 64, 66, respectively in and out of fluid chamber 24. The passageway 78 may be a single aperture or opening or in the alternate may be a plurality of openings arranged through each baffle 64, 66. The diameter and number of openings constituting passageway 78 may be dictated by the volumetric rate of fluid that flows through the subassembly 14.

A wiper not shown is positioned within the fluid chamber 24 of the tubular body 22 and is mounted or formed integral with axial shaft 54. The shaft 54 is a stainless steel rod positioned along the central axis of the fluid chamber 24 preferably with a thin stainless steel blade (not shown) extending from the shaft 54 to contact a surface of interior 58 of the tubular body 22. The wiper serves to keep the inner surface 58 of the tubular body 22 free of foulants and is preferably maintained in constant operation. A motor 60, e.g., an Autotrol Corporation Model 150 24V 50/60 hz operating at 3 rpm, may be used to rotate the wiper 52. However, other mechanisms may be used as known in the art, such as providing a wiper in a spiral configuration (not shown) to effect self-rotation.

A seal between the end 34 of tube 22 may include an o-ring 82 positioned between end cap 30 and U-cup 84. An inner seal 86 may be a flat, annular seal seated between light baffle 66 and end 34 of tubular body 22. The pair of tie rods 40 connecting the two end caps 28, 30 together provides compression of these seals 82, 86.

An embodiment of the invention includes a pair of high efficiency reflectors 68, which collect and focus scattered light emitted from the lamps 50 to the center of the tubular body 22 with the use of elliptical geometry. In one embodiment, the reflectors 68 may be attached by way of reflector mounts 80 to the end caps 28, 30. In this manner, nearly all of the emitted UV light from lamps 50A; 50B is used in irradiating fluid in fluid chamber 24 of tubular body 22. A feature of the reflectors 68 is a plurality of heat dissipating fins 70 arranged on an outer surface of the reflector. The fins 70 function to reduce the heat buildup inside of the UV subassembly 14.

Heat build up is also addressed by positioning a heat sink 62 adjacent each light source 50 (only one shown) opposite the lamp holder 51. Preferably, the heat sink is positioned in contact with a lamp 50 so as to cool a spot or area of the lamp. More preferably, a heat conducting material, like a gel or petroleum based material is used between the heat sink 62 and the lamp 50 for maximizing heat transfer between the lamp and the sink.

It is a feature of the invention that the tubular body 22 is oriented vertically with the sources 50 arranged in a parallel configuration. A lamp holder 51 is positioned at an upper end of the subassembly 14 and a respective heat sink 62 is positioned at a lower end of the subassembly adjacent the source 50. This arrangement results in a correct temperature for the filaments of the source 50 to provide proper emission of electrons therefrom and a cooler section (near the lower end) to provide a higher efficiency of operation without effecting the filament temperature (typically 200 degrees C.).

The heat sinks 62 are cooled by fans 88, which are held in place (underneath the heat sinks) by fan holders 90, which are brackets fastenable to end cap 28. In operation, the fans 88 can be activated and deactivated by a temperature sensor (not shown) which functions to operate the fans when the sensor detects a predetermined temperature. The fans 88 can be activated in a similar fashion based on fluid flow sensed by the flow sensor 26. During operation of the apparatus 10, air tends to circulate through the interior of the UV subassembly—that is, into the housing 12, 16 and both outside the UV subassembly and through the UV subassembly 14. The air, as it is heated, will tend to rise vertically along the cooling fins of the reflectors and also, between the inside of the reflectors and the tubular body 12. The fans 88 when operating draw outside air into the interior of the UV subassembly 14, and over the heat sinks 62, thus cooling lamps 50. Preferably, a significant portion of the lamp 50 is maintained between about 35–45 degrees C. for maximum efficiency by the above inventive elements and adaptations.

It can be seen that replacement of any or more than one component of the unit 10 can be performed quickly by virtue of the modular design of the invention and lateral access thereto. It can be seen that maintenance personnel need only detach the front 16 to access the radiation sources 50 and remove the radiation sources in a lateral direction. Removal of the cover 18 permits access to most or all of the electronic components (not shown).

While the apparatus and method herein disclosed forms a preferred embodiment of this invention, this invention is not limited to that specific apparatus and method, and changes can be made therein without departing from the scope of this invention, which is defined in the appended claims.

What is claimed is:

1. An apparatus for irradiation of a fluid with UV light comprising:

a vertical tubular body formed of a material which is UV-permeable, said tubular body including an inner surface defining a fluid chamber, and an open first end and an open second end for ingress and egress of the fluid through said fluid chamber;

a U-shaped radiation source for producing UV light arranged outside relative to said tubular body to subject said fluid chamber to the UV light, said radiation source including an upper end and a lower end, with filaments positioned in said upper end;

an active cooling feature for cooling the radiation source in contact with said lower end of said radiation source; and a reflector arranged relative to said radiation source to direct light emitted from said radiation source toward said fluid chamber, said reflector including heat dissipating elements disposed on an outside thereof.

2. The apparatus of claim 1 wherein said active cooling feature includes a heat sink.

3. The apparatus of claim 1 wherein said radiation source is a pair of parallel UV lamps.

4. The apparatus of claim 3 wherein said pair of parallel UV lamps are positioned on opposite sides of said tubular body.

5. The apparatus of claim 1 wherein said heat dissipating elements are oriented vertically.

6. The apparatus of claim 2 wherein said active cooling feature includes a fan, said fan being positioned so as to direct air onto said heat sink.

7. An apparatus for irradiation of a fluid with UV light comprising:

a vertical tubular body consisting of a material which is UV-permeable, said tubular body including an inner surface defining a fluid chamber, an open first end and an open second end for ingress and egress of the fluid through said fluid chamber;

a U-shaped radiation source having a first end at an upper end thereof and a second end opposite said first end, for producing UV light arranged outside relative to said tubular body as to subject said fluid chamber to the UV light, wherein said first end includes filaments and said second end includes a heat sink in contact therewith, wherein said heat sink is actively cooled, and a reflector arranged relative to said radiation source to direct light emitted from said radiation source toward said fluid chamber, said reflector including heat dissipating elements disposed on an outside thereof.

8. The apparatus of claim 7 wherein said radiation source is a pair of UV lamps.

9. The apparatus of claim 7 further comprising one or more fan positioned so as to direct airflow onto said heat sink of each of said pair of UV lamps.

10. The apparatus of claim 9 wherein a heat conductive material is provided between each respective said heat sink and said UV lamp.

11. The apparatus of claim 7 further comprising a flow sensor to sense fluid flow through said apparatus and generate a signal based on the fluid flow, said signal being used to control said filament by dimming said radiation source during a period of low fluid flow through said apparatus and reduce heat generation thereby.

* * * * *